United States Patent
Bansal et al.

(10) Patent No.: US 8,122,281 B2
(45) Date of Patent: Feb. 21, 2012

(54) SYSTEM AND METHOD FOR DEPENDENT FAILURE-AWARE ALLOCATION OF DISTRIBUTED DATA-PROCESSING SYSTEMS

(75) Inventors: Nikhil Bansal, Yorktown Heights, NY (US); Ranjita Bhagwan, Bangalore (IN); Yoonho Park, Chappaqua, NY (US); Chitra Venkatramani, Roslyn Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 11/735,026

(22) Filed: Apr. 13, 2007

(65) Prior Publication Data

US 2008/0256149 A1    Oct. 16, 2008

(51) Int. Cl.
*G06F 11/00*    (2006.01)
(52) U.S. Cl. .................. 714/3; 714/2; 714/4.1
(58) Field of Classification Search ............... 714/1–57; 370/216, 233, 237, 325; 706/14; 709/223–238
See application file for complete search history.

(56) References Cited

U.S. PATENT DOCUMENTS

| | | | | |
|---|---|---|---|---|
| 5,295,258 | A * | 3/1994 | Jewett et al. | 714/12 |
| 6,907,549 | B2 * | 6/2005 | Davis et al. | 714/46 |
| 7,000,154 | B1 * | 2/2006 | LeDuc et al. | 714/47 |
| 7,190,666 | B1 * | 3/2007 | Collins et al. | 370/216 |
| 7,409,586 | B1 * | 8/2008 | Bezbaruah et al. | 714/13 |
| 2003/0208470 | A1 * | 11/2003 | MacLellan et al. | 707/1 |
| 2005/0268156 | A1 * | 12/2005 | Mashayekhi et al. | 714/4 |
| 2007/0162673 | A1 * | 7/2007 | Garg et al. | 710/240 |
| 2008/0114870 | A1 * | 5/2008 | Pu | 709/224 |

OTHER PUBLICATIONS

Castro, et al.; Practical Byzantine Fault-tolerance. Proceedings of the Symposium on Operating Systems Design and Implementation, 1999; pp. 1-14.

Amini, et al.; SPC: Distributed, Scalable Platform for Data Mining; Proceedings of the Fourth International Workshop on Data Mining Standards, Services and Platforms, 2006; 11 pages.

Hwang, et al.; High-Availability Algorithms for Distributed Stream Processing; The 21st International Conference on Data Engineering (ICDE 2005), Tokyo; 2005; 12 pages.

Pietzuch, et al.; Network-Aware Operator Placement for Stream-Processing Systems; Proceedings of the 22nd International Conference on Data Engineering (ICDE'06); 2006; 12 pages.

Verscheure, et al.; Who is talking to Whom in VoIP Networks via Progressive Stream Clustering; Proceedings of the IEEE International Conference on Data Mining (ICDM), Dec. 2006; pp. 1-11.

Dean et al.; MapReduce: Simplified Data Processing on Large Clusters; Proceedings of the Symposium on Operating System Design and Implementation, 2004; pp. 1-13.

(Continued)

*Primary Examiner* — Scott Baderman
*Assistant Examiner* — Sarai Butler
(74) *Attorney, Agent, or Firm* — Tutunjian & Bitetto, P.C.; William J. Stock, Esq.

(57) ABSTRACT

A system and method for allocating distributed processing systems includes inputting component descriptions in a distributed processing system and determining importance of each component. Capacity and failure characteristics of resource groups representing units of available processing capacity are also input. Components are assigned to a plurality of resource groups based on the capacity. Each resource group includes components where the failure characteristics permit simultaneous failures, such that in the event of such failures, an output value of the application is maximized.

20 Claims, 8 Drawing Sheets

OTHER PUBLICATIONS

Pike, et al.; Interpreting the Data: Parallel Analysis with Sawzall; Scientific Programming Journal. Special Issue on Grids and Worldwide Computing Programming Models and Infrastructure 13:4; 2005; pp. 227-298.

Rhee; Optimal fault-tolerant resource allocation in dynamic distributed systems; Proceedings of the 7th IEEE Symposium on Parallel and Distributed Processing, 1995; 8 pages.

Bhagwan, et. al.; TotalRecall: System Support for Automated Availability Management; Proceedings of the First ACM/Usenix Symposium on Networked Systems Design and Implementation (NSDI), 2004; pp. 1-14.

Junqueira, et al.; Surviving Internet Catastrophes; Proceedings of USENIX Annual Technical Conference, May 2005; 16 pages.

Yalagandula, et al.;. Beyond Availability: Towards a Deeper Understanding of Machine Failure Characteristics in Large Distributed Systems; Proceedings of USENIX WORLDS, 2004; 6 pages.

Xing, et al.; Providing resiliency to load variations in distributed stream processing; Proceedings of the International Conference on Very Large Databases; 2006; 12 pages.

* cited by examiner

SYSTEM AND METHOD FOR DEPENDENT FAILURE-AWARE ALLOCATION OF DISTRIBUTED DATA-PROCESSING SYSTEMS

GOVERNMENT RIGHTS

This invention was made with Government support under Contract No.: H98230-05-3-0001 awarded by the U.S. Department of Defense. The Government has certain rights in this invention.

BACKGROUND

1. Technical Field

The present invention relates to fault-tolerance of distributed data-processing systems and applications, and more particularly to a system and method for dependent failure-aware allocation of distributed data-processing systems 2. Description of the Related Art In networked infrastructures such as large clusters, distributed computing testbeds or the Internet, a large group of machines can all fail or lose connectivity together due to anomalies such as network disconnection, power failures, or internet-scale viruses and worms. Given that the distributed system/application has to run in this environment, the assignments of individual components of the distributed application to resources across the network has to be determined so that when groups of resources fail together, the output of the application is minimally affected. Here, the output of the system or application is the set of results produced as a result of data processing transformations applied by its components.

Hwang et al., in "High-Availability Algorithms for Distributed Stream Processing", The 21st International Conference on Data Engineering (ICDE 2005), Tokyo, address the issue of fault recovery in stream processing systems by using techniques such as storing data and checkpointing. Research in stream processing systems has addressed the issue of resource allocation more for the purposes of making optimal use of available resources. Pietzuch et al., in "Network-Aware Operator Placement for Stream-Processing Systems". Proceedings of the 22nd International Conference on Data Engineering (ICDE'06), 2006, have devised an algorithm to allocate resources in the wide area to optimize network usage of a stream processing system.

Cetintemel et al. in "Providing resiliency to load variations in distributed stream processing", Proceedings of the International Conference on Very Large Databases, 2006, describe a method to allocate resources in stream processing systems that tries to maximize system usage while not overloading individual machines. While both these are relevant given that they are addressing issues of resource allocation in stream processing environments, they do not consider the possibility of failure in their allocation strategies.

Rhee et al., in "Optimal fault-tolerant resource allocation in dynamic distributed systems." Proceedings of the 7th IEEE Symposium on Parallel and Distributed Processing, 1995, describe an algorithm to allocate components to resources for high fault-tolerance in message passing systems. It considers a number of application/system components that are all vying for the same set of resources. There is an inherent assumption here that the number of resources is smaller than the number of components, and that the components have to share the resources in a time-ordered fashion. The algorithm described in Jee et al. minimizes the number of components waiting on that resource to be freed.

The Phoenix recovery system described in Junqueira et al., "Surviving Internet Catastrophes." Proceedings of USENIX Annual Technical Conference, May 2005, shows that individual "processes" can be grouped into "clusters" based on which processes tend to fail together, all processes that can fail together being grouped into one cluster. The authors use this model to build a replication strategy for large-scale systems that preserves the system in the face of internet-wide virus and worm attacks. In particular, they form replica sets consisting of processes picked from many different heterogeneous clusters. This and other work on fault-tolerance in distributed systems assume an all-or-nothing failure model for applications. That is, if any of the application components fail, the whole application fails and its output is zero.

SUMMARY

The present focus is on a suite of distributed systems in which informed resource allocation, not just replication, can help achieve better functionality in spite of failures. One goal is to devise a resource allocation strategy that can be used along with other techniques such as replication to increase the fault-tolerance properties of the distributed application.

A solution is focused on making an application perform as well as possible (possibly producing output of reduced value) given that some failures have occurred, and before a full recovery takes effect. The focus is on applications that can produce useful output in spite of partial failures and a method as described herein allocates the application components to resource groups such that their output value is maximized in spite of failures of resource groups.

The present principles provide techniques to allocate distributed applications that can tolerate partial failures, to resource groups, such that their output value is maximized in spite of failures. A resource group includes resources that can fail simultaneously. One resource allocation technique takes as input: i. The data-flow graph topology of the application. ii. The value of each individual input to the application. iii. The operation performed by each component. iv. The resource requirements of each component. v. Resources grouped by their failure characteristics. That is, all resources that could fail or disconnect simultaneously due to network partitions, power supply failures or software misconfigurations, are allocated to the same group.

A method to quantify how the failure of an application-component affects the useful output of the distributed application is provided. This is computed as the loss of output value of the application if this component fails. For aggregation-based applications, a method is provided to transform the problem of maximizing expected output value of the application to a graph-coloring problem, e.g., minimizing the number of colors in each path of its data flow graph.

An optimal polynomial-time system/method for allocating aggregation tree-based applications, composed of equivalent components, to homogeneous resource groups is also provided. A greedy, heuristic method is provided for generic applications.

A system and method for allocating distributed processing systems includes inputting component descriptions including their processing requirements and the type of operation they perform, and determining the importance of each component to the output of the system. It also includes inputting the available processing capacity of resource groups and determining the assignment of components to a plurality of resource groups based on the capacity and failure characteristics. The failure characteristics of each resource group permits simultaneous failure, and the components included are such that in the event of the failure of a resource group, the output value of the application is maximized.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1A:
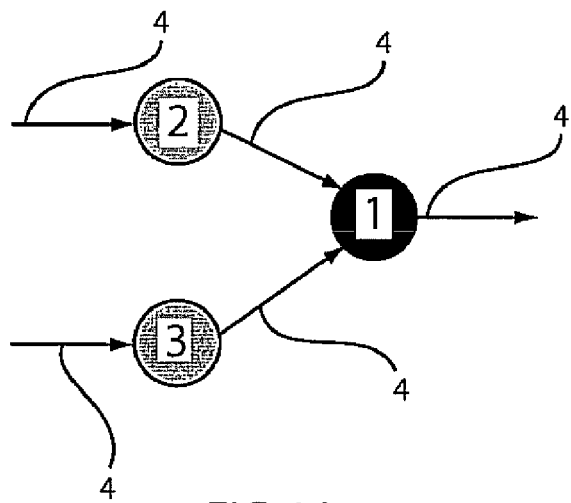
FIGS. 1A, 1B and 1C show simple examples to illustrate fault-tolerant resource allocation in accordance with the present principles.

Present embodiments address the issue of fault-tolerance of distributed data-processing systems and applications when portions of the applications are faced with what are known as "dependent failures" and the applications are capable of producing output despite these partial failures. These embodiments address distributed systems or applications where individual components of the system or application communicate directly with each other. In other words, each system or application can be specified as a directed acyclic graph, where each vertex is a component of the overall system/application, and each edge represents direct communication between the components.

The present embodiments target systems in which failure of a component does not completely halt the functioning of the system, i.e. the output from a partially running system would still have some value. Examples of such systems and applications are cluster-based data mining systems such as those built using Google's MAP-REDUCE™, and distributed stream-processing applications such as "Who is Talking To Whom" (WTTW) (see FIG. 4).

The method described here determines a best resource allocation strategy that will maximize the output value of a distributed application or system in spite of simultaneous failures of groups of resources. The allocation strategy may employ four parameters specified by the application or system: a) The intrinsic "value" of the external input data to the application or system components. This is expected to be an absolute scalar value specific to the system or application. b) The type of operation performed by each component. This enables the system to conclude what the value of the output is, based on the value of the input. c) The expected resource usage by the system or application components. d) The topology of the application or system graph, based on the communication pattern between application components.

Advantages of using the present scheme include at least the following: 1) The present embodiments are an informed resource allocation policy that does not require any additional resources than would be required to run the application or system without any fault-tolerance strategies. 2) The resource allocation strategy is specifically designed to cope with dependent failures, i.e. simultaneous failures of groups of resources. Coping with dependent failures is particularly important in large-scale distributed systems which are becoming more and more prevalent.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The problem can be stated as follows: given a distributed data-processing system or application and the requirements of its individual components, how should one allocate the components to different groups or resources such that the expected value of the output from these applications is maximized in the face of dependent failures?

Figure 1B:
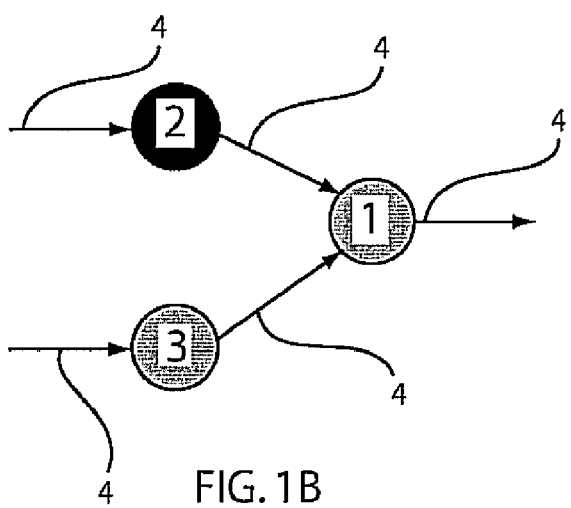
Figure 1C:
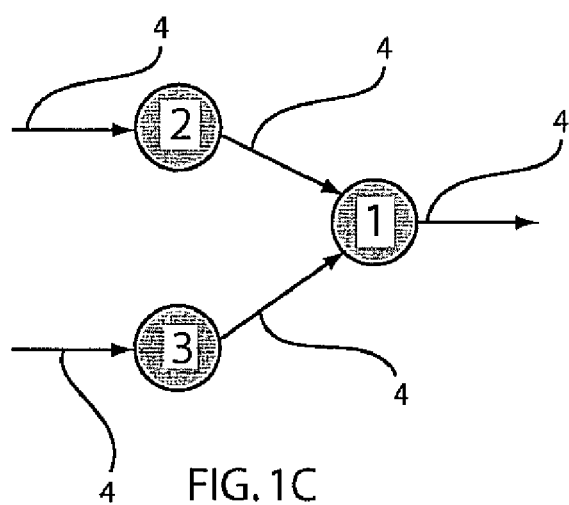

Referring now to the drawings in which like numerals represent the same or similar elements and initially to FIGS. 1A, 1B and 1C, graphs representing a simple distributed system with three similar components 1-3, and with the data flow denoted by the directed edges 4. Let us assume that the input values at leaves 2 and 3 are the same. In FIG. 1A, the root node 1 is assigned to one set of machines, or group, and nodes 2 and 3 (the leaves) are assigned to another group. This is indicated by the coloring of the graph.

Similarly in FIG. 1B, nodes 1 and 3 are assigned to the same group while node 2 is assigned to another group. The allocation in FIG. 1B is better than the allocation in (a) because if the dark (black) group fails, then the output of the system for allocation FIG. 1A would go to 0. On the other hand, with allocation FIG. 1B, the system could process data flowing through from node 3 to node 1. If the stipled (grey) group fails, both allocations give no output. When we consider all the failure possibilities and measure the expected output value, allocation FIG. 1A performs better.

However the best allocation is FIG. 1C, with all nodes on the same group. The main intuition behind this is that allocation FIG. 1C is affected by the failure of only one group, whereas the other two are affected if either of two groups fail. The following example gives an idea of how resource allocation such as the above can be useful in a real-world scenario.

Figure 2:
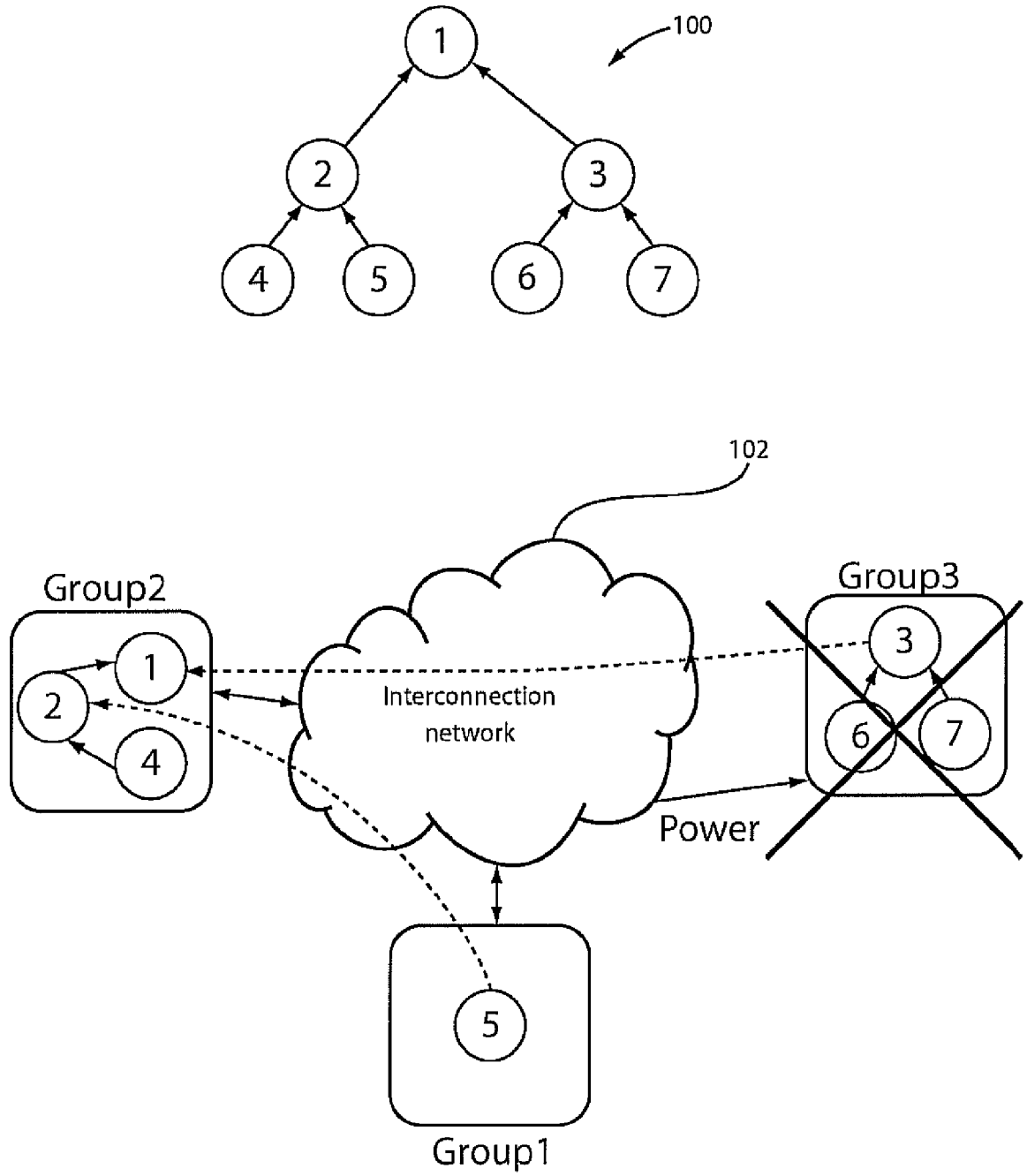
FIG. 2 shows an application being allocated which has an aggregation-based data flow graph shown at the top of FIG. 2 where groups 1, 2 and 3 are connected through an interconnection network.

Referring to FIG. 2, let us say group 1, group 2 and group 3 are resource groups that have similar failure characteristics, such as being in the same machine cluster. These are connected through an interconnection network. An application 100 is allocated to the three groups such that node 5 is in group 1, nodes 1, 2 and 4 are in group 2, and nodes 3, 6, and 7 are in group 3. The application 100 being allocated has an aggregation-based data flow graph shown at the top of FIG. 2. This is allocated on groups 1, 2 and 3 which are connected through an interconnection network 102.

Now, if an event such as a power failure takes down group 3 completely, the paths from leaf 5 to the root and from leaf 4 to the root are preserved and the application can produce useful output. If, however, nodes 4, 5, 6 and 7 are all allocated to group 3, the power failure would bring down the entire application.

In general, it is always better to allocate all components to the same group to maximize the availability. However, this is not always possible because of resource constraints on individual groups. The above example gives an idea of what the problem is, and how topology-based resource allocation can improve the availability of distributed systems and applications. Now, the failure model, the application model, and the problem space will be explained in greater detail.

Failure model: a failure model proposed by Junqueira et al. may be employed. The failure model groups a set of "processes" into "groups", where, each group can fail in its entirety, causing all nodes in that group to be unavailable. Individual group failures are considered independent and identically distributed. This model is considered more practical than a simple independent failure model because it represents a number of large-scale systems such as: 1. Large machine clusters: These are often comprised of multiple blade centers, where each blade center is connected to the other through a switch or a set of switches. Other than independent machine failures, it is possible that entire blade centers get disconnected from the rest of the network due to link failures, switch misconfigurations or localized power outages. In this case, a "group" is comprised of a single blade center, while each blade, or machine, is one of the "processes" within the group.

2. Wide-area distributed systems: In applications that run over the wide area, groups of machines can get completely partitioned and disconnected from a number of reasons such as network disconnections, software errors, system misconfigurations and DoS attacks. A distributed wide-area testbed, which has numerous correlated failures can be represented better by using the dependent failure model in accordance with the present principles.

3. Distributed stream-based applications: The failure model applies to stream-processing applications in a slightly different way. In a stream processing system, an application is divided into a set of components which the system allocates to different machines. When a machine fails, it effectively causes the failure of all the application components that run on it. In this case, the "processes" are the application components and the each machine can be regarded as a "group".

Figure 3:
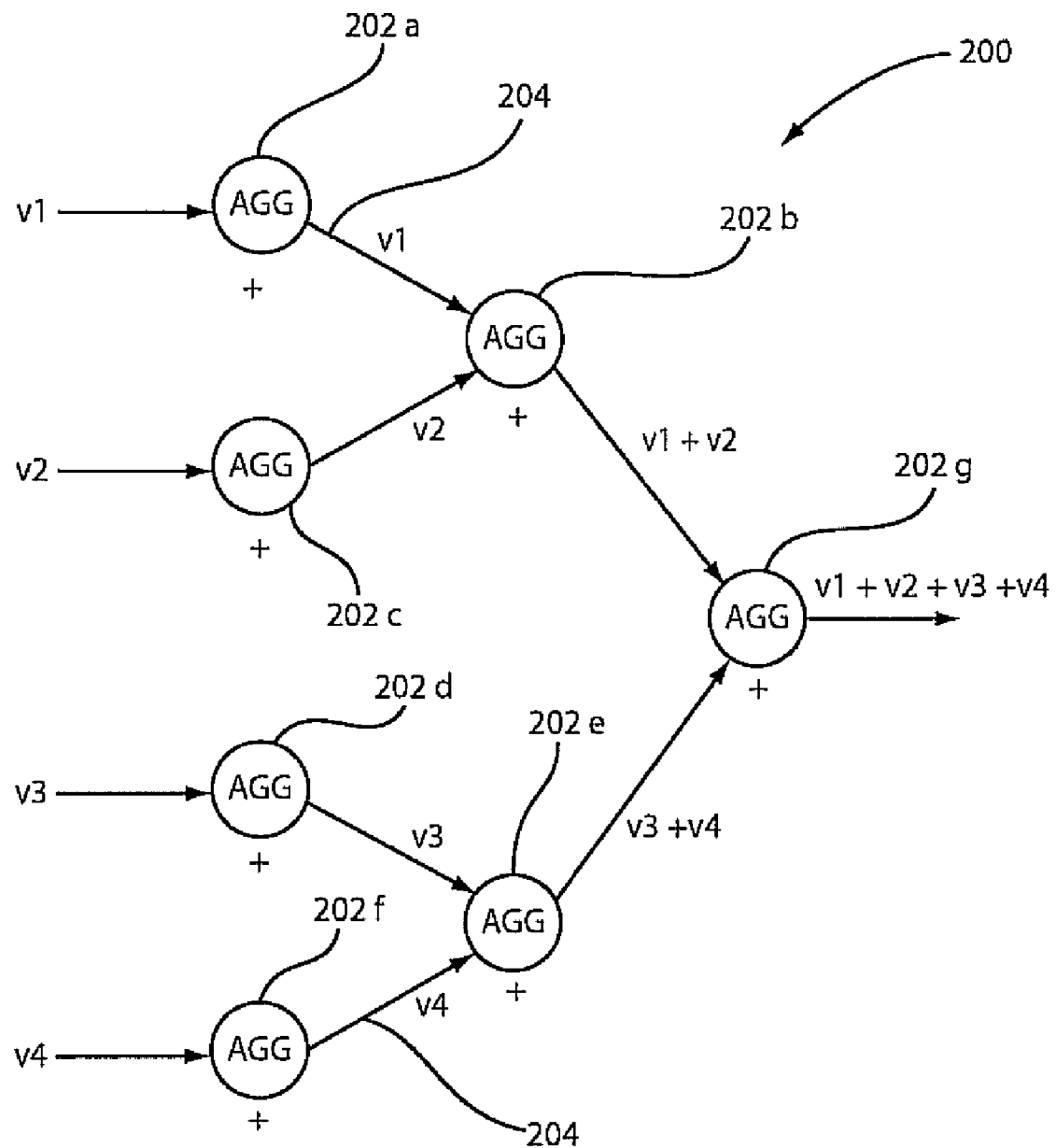
FIG. 3 shows an example graph for a distributed data aggregation system.
Figure 4:
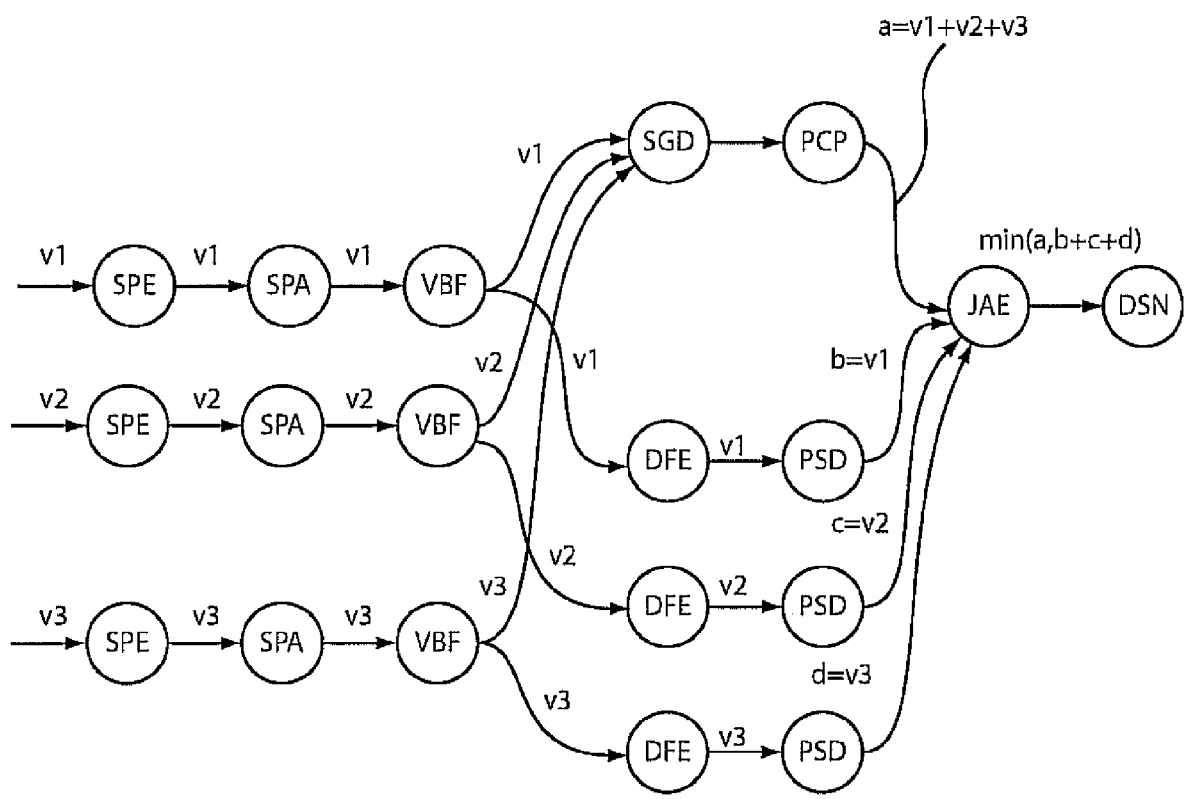
FIG. 4 shows an example graph for "Who is Talking To Whom" (WTTW), a distributed stream-based voice over internet protocol (VOIP) application.

FIGS. 3 and 4 are examples of how the present embodiments (application and system model) can be applied in different scenarios. An application model is targeted towards distributed data-processing applications including multiple components that have data flowing between them. The application is preferably representable as a directed acyclic graph with a set of sources and a set of sinks.

Referring to FIG. 3, in this instance, a distributed data aggregation system is depicted. A system graph for a distributed data aggregation system represents, e.g., a MapReduce-based Sawzall (see Pike et al. "Interpreting the Data: Parallel Analysis with Sawzall." Scientific Programming Journal. Special Issue on Grids and Worldwide Computing Programming Models and Infrastructure 13:4, pp. 227-298).

Each system component 220 is an aggregator (AGG) and the value of the data output by the aggregator is the sum of the values of all incoming data. Each node 202 represents an individual application component and each directed edge 204 represents data flow between the two application components or aggregators (AGG).

An input stream coming into a node has a certain value (v), and each node 202 can transform this value by a constant factor. In this embodiment, each component's output value should be representable by a linear combination of its input values, or as the minimum of all its input values. For example, streams v1 and v2 are input to node 202b and v1+v2 is output. Each component's requirement in terms of how compute-intensive it is needs to be specified.

Referring to FIG. 4, an application graph for WTTW, a distributed stream-base voice over internet protocol (VOIP) application is illustratively depicted. An example stream-processing application is depicted running on a Distributed, Scalable Platform framework, called the Stream Processing Core (SPC). This application analyzes speech data and performs actions such as speaker detection and conversation pairing. In this application, components named SPE, SPA, VBF, SGD, PCP, DFE and PSD use the SUM operator. The component named JAE performs a join operation on its inputs, and if the output of PCP goes to 0, the join operation fails entirely. Hence, JAE uses the MIN operator to characterize its output.

The present invention is not directed to applications or systems with circular data dependencies. The problem statement can be summarized in the following way. Given a certain resource constraint, i.e. each group has size c, the requirements and characteristics of application components and values of incoming data, and given that the probability of a group failing is p, find the allocation of components to groups such that it maximizes the expected output of the application.

This problem, in general, is intractable. However, for tree graphs, such as the system described in FIG. 3, an optimal solution to this problem (under a certain technical assumption) has been determined. The optimal solution and a heuristic solution used for a more general case will be described hereinafter.

For the optimal solution, all inputs are assumed to have the same value, components have the same resource requirements as each other, and all the groups are of the same size. Each component's output value is the sum of the values of its inputs. This simplified version of the problem is solvable using a polynomial-time algorithm, given a collection of components and a set of groups on which these components can be allocated. Say, e.g., each group can hold up to c components. Call c the capacity of the group.

Figure 5A:
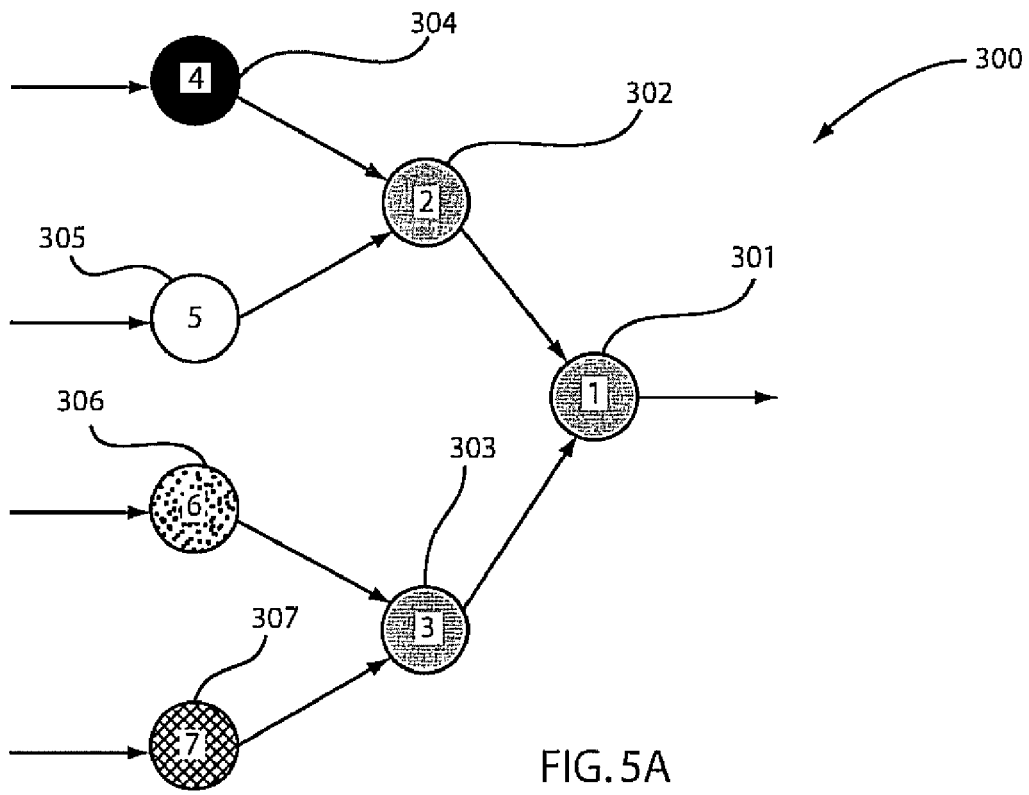
FIGS. 5A and 5B show two different resource allocation strategies for the aggregation-based distributed system shown in FIG. 3.

Referring to FIG. 5A, a topology of the components constitutes a rooted tree 300. At leaf L, input data with value v_L enters L and travels towards the root. An intermediate node m collects the data from its children, processes them and forwards the output to its parent. If v_1, . . . v_k are the values of the streams entering m, we assume that the value of m is v_1+ . . . +v_k. In fact, we can allow more generally the value to be Σc_i v_i where c_i is a fixed constant associated with the edge connecting m to its ith child. We assume that all primal values v_i and all the constants c_i are non-negative. We assume that groups fail independently with probability p.

Suppose we are given a placement of the components on the groups. If some group fails, then all the components that are allocated to this group fail. If a component fails, then the value of the data produced by it goes down to 0. The following lemma characterizes the effect of group failures.

Lemma 1: Let X: P–>N be some fixed placement of components to groups. For a leaf L, let S(L) be the set of groups on the path from L to the root. Let c(L) denote the product of all the edge-dependent constants c_i on the path P(L), and v_L denote the value of the primal stream entering L. The expected overall value is $$\Sigma_L (1-p)^{d(L)} c(L) v\_L \quad (1)$$

where d(L) is the distinct number of groups on the path P(L).

If p is small, which is the case with most failure probabilities, this can be approximated as:

$$\Sigma L (1-pd(L)) c(L) v\_L \quad (2)$$

Hence, the problem of maximizing equation (1) can be reduced to the problem of minimizing $\Sigma_L (1-p\, d(L)) c(L) v\_L$, or maximizing $\Sigma_L c(L) d(L) v\_l$, since p is fixed. Note that both c(L) and v_L are fixed for an instance and are independent of the solution.

Given Lemma 1 above, the problem can be viewed as follows. A rooted tree T=(V,E) is specified by the vertex set V and edge set E, and each leaf is specified by two values v_L and c_L. Every component, or vertex m, has a constant c_m associated with it. Also given is the capacity of each group c and the goal is to color/texture the vertices of this tree such that no color/texture is used more than c times and the quantity in equation 1 is maximized. The goal is to color/texture the vertices of the tree such that each path has as few colors/textures as possible. For example, each color/texture represents a group of components that fail together. The group may be represented in a plurality of ways, in the present examples color/texture is employed for the understanding of the reader.

Figure 5B:
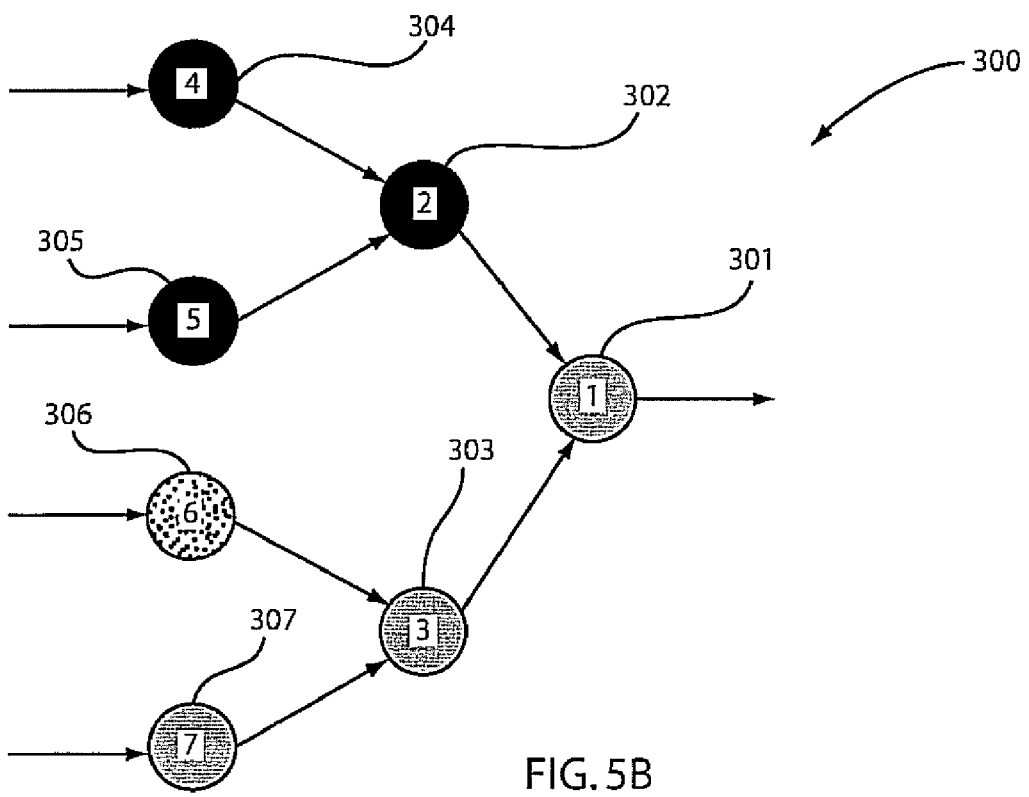

Referring to FIGS. 5A and 5B, example graphs with two possible colorings/textures are show for with c=3 (three different designations or colors/textures). In the allocation of FIG. 5A, all paths from leaf (304, 305, 307, 307) to root (301) have exactly two colors. On the other hand, the allocation in FIG. 5B has two colors on all paths except path 307-303-301, which has only one color. Hence overall, FIG. 5B provides a better allocation strategy than FIG. 5A.

For aggregation-based applications (FIG. 3), a method is provided to transform the problem of maximizing expected output value of the application to a graph-coloring problem, by minimizing the number of colors in each path of its data flow graph.

The following dynamic programming-based program 1 can be used to obtain the optimal allocation as described in accordance with one illustrative embodiment.

Program 1:

```
Sumvalues(node) {
   //computes total value entering the subtree rooted at node
   If node is a leaf, return value entering this node ;
   else return sum of sumvalues(children) of children of node.
}
findalloc ( node, capacity) {
// computes optimum allocation. Call as findalloc( root, c). It
returns minimum value of loss possible
      loss =0;
      if capacity ==0 {
         loss = Sumvalues(node) + findalloc(node, c);
      }
      else {
         if node is a leaf
            return value of leaf;
         else{
            d= degree of node
            return findallocspecial ( node, capacity−1, d);
         }
      }
}
findallocspecial(node, capacity, j){
// assert:     j>0     (because node is not a leaf)
      if capacity ==0{
         calc=0;
         for q= 1 to j{
            calc += findalloc(child q of node, c ) +
sumvalues(child q of node) ;
         }
         return calc;
      }
      else {
         if j==1 return findalloc(child 1 of node, capacity );
         temp1 = findallocspecial(node, capacity, j−1) +
findalloc(child j of node, c)+ sumvalues(child j of node);
         temp2 = infinite;
         for (q=0 to capacity −1 ) {
            temp2 = min(findallocspecial(node,capacity−q,j−1) +
findalloc(child j of node, q),temp2);
         }
         return min (temp2 , temp 1)
      }
}
```

Referring again to FIG. 5, in the example graph, component 1, or the root, is allocated to the grey group. Since c=3, the capacity of grey goes down to 2. The possible partitions of 2 between the sub-trees of component 1 are {2,0}, {0,2} and {1,1}. The allocation of FIG. 5A is obtained using the {1,1} partition. With a {1, 1} partition, node 2 and node 3 are colored grey, causing the capacity of grey to go to 0. Their children, 4, 5, 6, and 7, being leaves, are all colored for different groups. With {0,2}, on the other hand, the allocation of FIG. 5B is obtained, and the loss value is smaller than in the case of {1,1} because of the path from 7 to 3. Therefore, since {0,2} gives a better allocation, i.e. fewer colors used for the paths in the sub-trees, we pick {0,2}.

This algorithm is optimal for trees when capacities are identical. It may not work however for arbitrary acyclic graphs or when different components can have differing resource requirements. Hence, a heuristic based on a greedy approach is provided. The heuristic is similar to the optimal algorithm, and reduces the number of colors on each path from source to sink.

Figure 6:
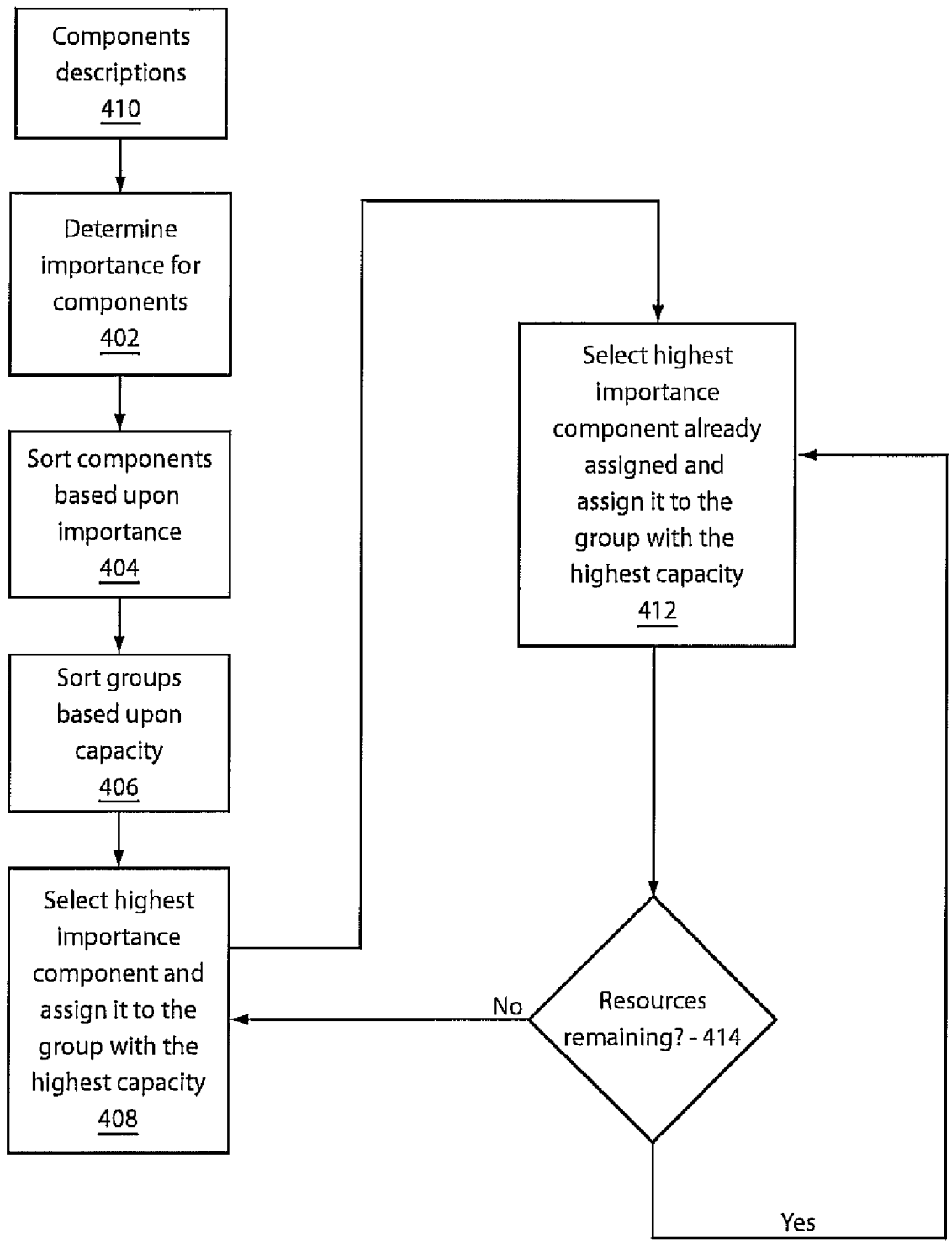
FIG. 6 is a block/flow diagram showing a system/method for allocating distributed processing systems in accordance with one embodiment.

Referring to FIG. 6, a block/flow diagram depicts a system/method to determine component placement in accordance with an illustrative example. In block 410, component descriptions are provided. Component descriptions may include information such as resource usage, external input value, operation type or any other data or information that is pertinent to workflow processing for each component in a system.

A resource group includes resources that can fail simultaneously. This resource allocation may take as input: i. The data-flow graph topology of the application. ii. The value of each individual input to the application. iii. The operation performed by each component. iv. The resource requirements of each component. v. Resources grouped by their failure characteristics. That is, all resources that could fail or disconnect simultaneously due to network partitions, power supply failures or software misconfigurations, are allocated to the same group.

In block 402, an importance is determined/computed for every component, where importance is defined as the loss in total output value if that component fails. In block 404, the components are sorted based on their importance. In block 406, groups of components are sorted based on their capacity. In block 408, a most important component is selected, and assigned to the next remaining group with highest capacity. If the group still has resources remaining, pick the component with highest importance that is connected to an already assigned component (in the graph) and assign it to this group in block 412. Perform block 412 until the group has no resources remaining or there are no other components left to allocate. Then in block 414, go back to block 408.

Figure 7:
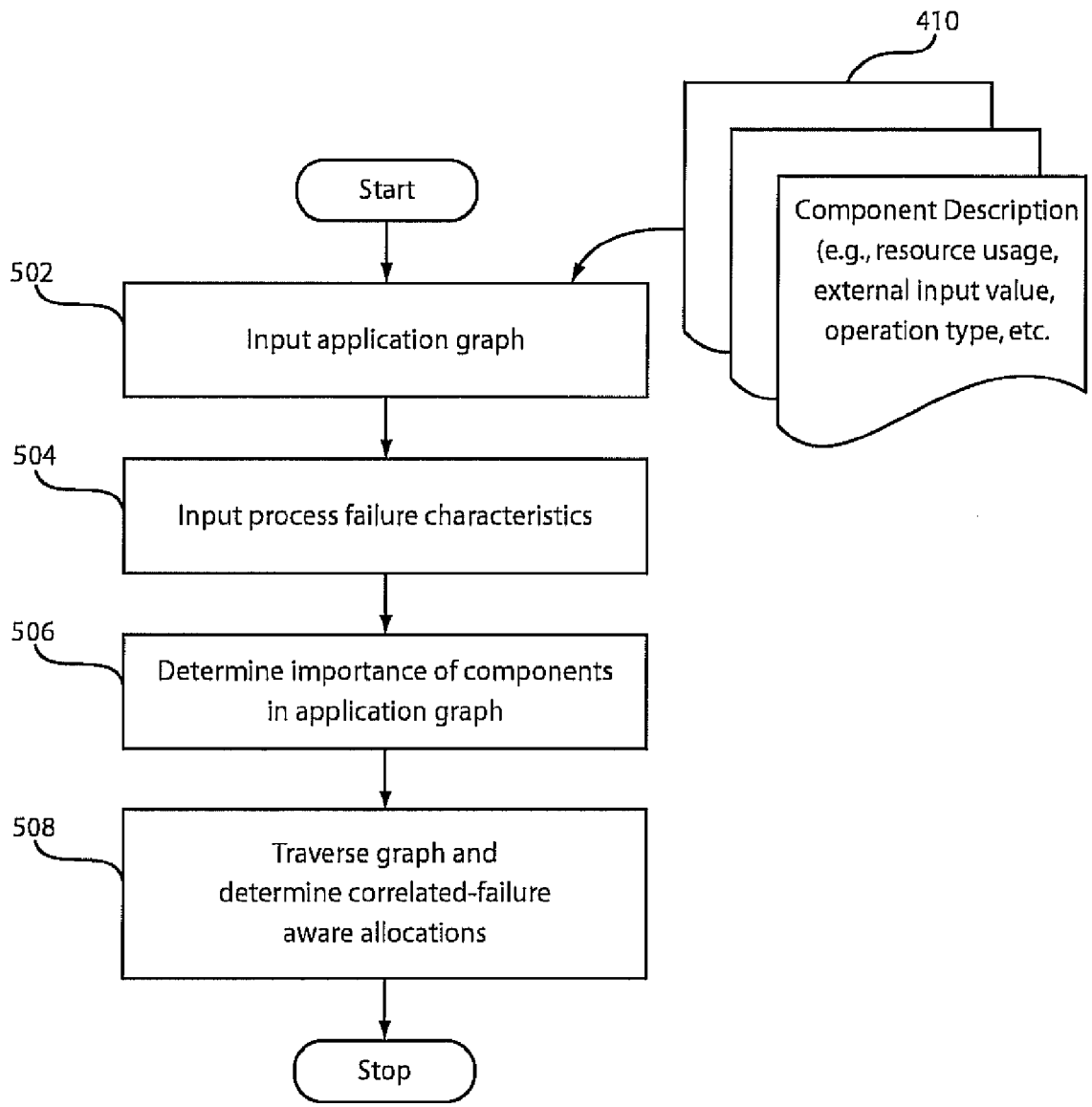
FIG. 7 is a block/flow diagram showing a system/method for allocating distributed processing systems in accordance with another embodiment.

Referring to FIG. 7, a block/f low diagram depicts a system/method to determine component placement in accordance with an illustrative example. Component descriptions 410 are provided with an input application graph in block 502 with edges joining the components described in the component description. In block 504, process failure characteristics are input. This includes group information where a failure of one component determines the failure of other components. In block 506, a determination of the importance of components in the application graph is made.

In block 508, the graph is traversed to determine correlated failure-aware allocations. This includes assigning the most importance components to groups of components based on their capacity. A most important component is selected, and assigned to the next remaining group with highest capacity. If the group still has resources remaining, the component with highest importance that is connected to the already assigned component in the graph is assigned to the high capacity group. Then a determination is made quantify how the failure of an application-component affects the useful output of the distributed application. Importance is based upon the loss of output value of the application if this component fails.

An optimal polynomial-time algorithm for allocating aggregation tree-based applications, composed of equivalent components, to homogeneous resource groups is provided. A greedy, heuristic algorithm, e.g., of FIGS. 6 and 7 is provided for generic applications. The method of FIG. 6 was applied to the WTTW stream application introduced in FIG. 4, the resulting allocation is shown in FIG. B.

Figure 8:
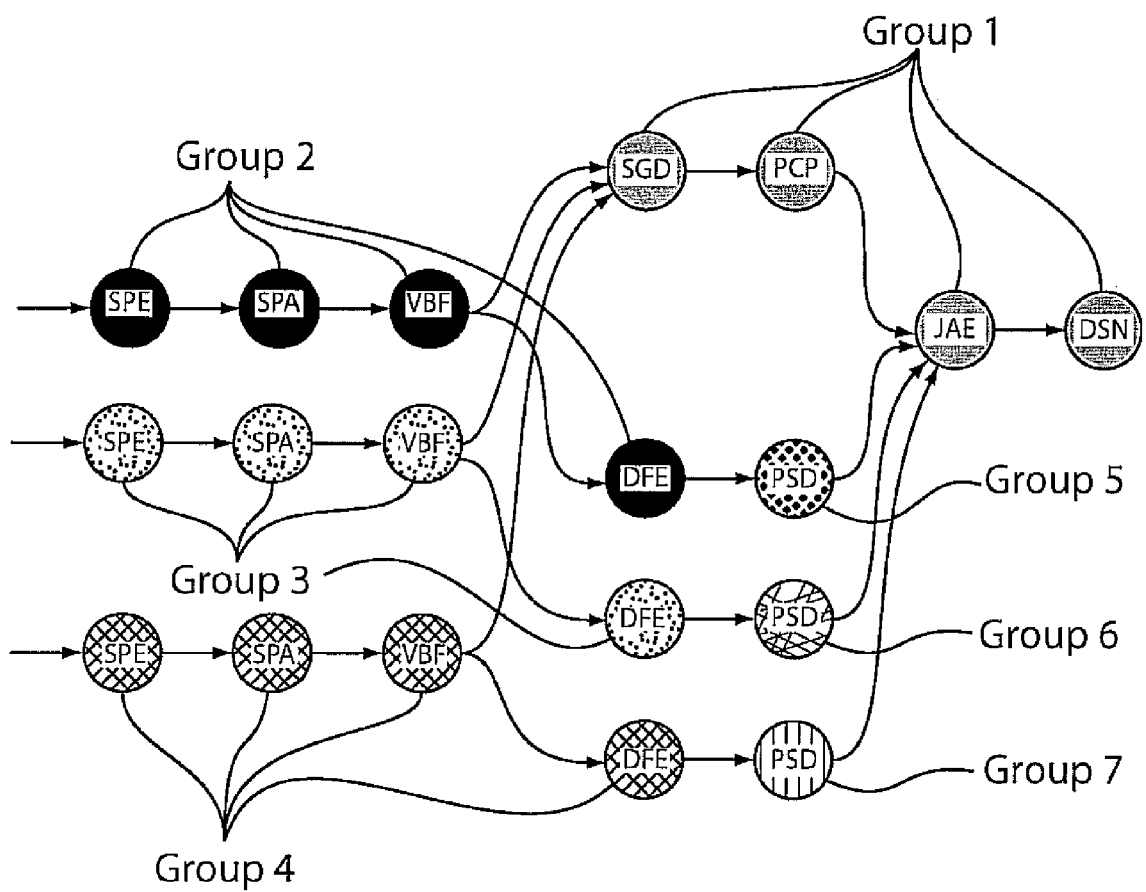
FIG. 8 shows a resource allocation strategy for the distributed stream-based VOIP application (WTTW), shown in FIG. 4.

Referring to FIG. 8, for simplicity of explanation, all components, except PSD, have been assumed to require 25% of the CPU. PSD, which is a speaker detection component of the application, is highly compute-intensive and needs to run exclusively on one machine. In this case, as explained above in the failure model, each group (1-7) is an individual machine, hence a resource allocation algorithm can be used to partition the application to run on a set of machines.

All the components' output values are the sum of the input values, except for JAE, which uses the MIN operator as described with reference to FIG. 4. Hence, the most important components of this application are JAE, DSN, PCP and SGD since if any one of these components dies, the entire output of the application is lost. The method first places these important components in group 1 since there is available capacity on the machine. All the other nodes have the same importance, i.e. if any one of them dies, the output value drops by a third. Hence the method tries to place the nodes on the same path on the same group (e.g., groups 2, 3, and 4). As the three PSD components are very compute intensive, they are placed exclusively on a separate group (groups 5, 6, and 7).

Having described preferred embodiments of a system and method for dependent failure-aware allocation of distributed data-processing systems (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims,

What is claimed is:

1. A method for allocating distributed processing systems, comprising:
   inputting an application graph having component descriptions and connections between the components in a distributed processing system;
   determining an importance of each component;
   inputting capacity of groups representing units of available processing capacity and failure characteristics associated with the units; and
   assigning components based on importance and resource requirements, to a plurality of resource groups based on the capacity of the resource groups where failure characteristics of each resource group permit simultaneous failure, such that in the event of a failure, an output value is attainable,
   wherein assigning components includes continuously selecting an unassigned component with a highest importance that is directly connected to an already-assigned component in the application graph.

2. The method as recited in claim 1, wherein inputting component descriptions includes inputting a data-flow graph topology of an application including components and interconnections associated with the components.

3. The method as recited in claim 1, wherein inputting component descriptions includes inputting a value of individual inputs to an application.

4. The method as recited in claim 1, wherein inputting component descriptions includes inputting operations performed by each component.

5. The method as recited in claim 1, wherein inputting component descriptions includes inputting resource requirements for each component.

6. The method as recited in claim 1, wherein determining importance of each component includes computing importance based upon a loss of output value of an application if the component fails.

7. The method as recited in claim 1, wherein assigning components includes grouping resources in accordance with failure characteristics associated with the components such that a failure of one component in a group results in a failure of all components in the group.

8. The method as recited in claim 1, wherein the distributed processing system executes an aggregation-based application and assigning components involves minimizing a number of resource groups in each path from a leaf to a sink.

9. The method as recited in claim 1, wherein components are continuously assigned to a resource group with a highest, available capacity until there is either insufficient resources or until there are no remaining components left to assign.

10. A computer program product for allocating distributed processing systems comprising a non-transitory computer readable storage medium including a computer readable program, wherein the computer readable program when executed on a computer causes the computer to perform the steps of:
 inputting an application graph having component descriptions and connections between the components in a distributed processing system;
 determining an importance of each component;
 inputting capacity of groups representing units of available processing capacity and failure characteristics associated with the units; and
 assigning components based on importance and resource requirements, to a plurality of resource groups based on the capacity of the resource groups where the failure characteristics of each resource group permit simultaneous failure, such that in the event of a failure, an output value is attainable,
 wherein assigning components includes continuously selecting an unassigned component with a highest importance that is directly connected to an already-assigned component in the application graph.

11. The computer program product as recited in claim 10, wherein inputting component descriptions includes inputting a data-flow graph topology of an application.

12. The computer program product as recited in claim 10, wherein inputting component descriptions includes inputting a value of individual inputs to an application.

13. The computer program product as recited in claim 10, wherein inputting component descriptions includes inputting operations performed by each component.

14. The computer program product as recited in claim 11, wherein determining importance of each component includes traversing the data-flow graph topology of an application to determine correlated failure-aware allocations.

15. The computer program product as recited in claim 10, wherein assigning components includes grouping resources in accordance with failure characteristics associated with the components such that a failure of one component in the group results in the failure of all components in the group.

16. The computer program product as recited in claim 10, wherein determining importance of each component includes computing importance based upon a loss of output value of an application if the component fails.

17. A method for allocating distributed processing systems, comprising:
 inputting an application graph having component descriptions and connections between the components in a distributed processing system;
 determining importance of each component;
 determining capacity of groups representing units of available processing capacity;
 assigning components to a plurality of resource groups based on the capacity of each resource group, wherein assigning includes:
 continuously selecting an unassigned component with a highest importance that is directly connected to an already-assigned component in the application graph;
 grouping components in accordance with failure characteristics associated with the components such that a failure of one component in the group results in the failure of all components in the group; and
 optimizing output value such that in the event of failures of resource groups, the output value is attainable.

18. The method as recited in claim 17, wherein the component descriptions include at least one of: a data-flow graph topology of an application; a value of individual inputs to an application; operations performed by a component; resource requirements for a component, and relationships with other components.

19. The method as recited in claim 17, wherein determining importance of each component includes computing importance based upon a loss of output value of an application if the component fails.

20. A computer program product for allocating distributed processing systems comprising a non-transitory computer readable storage medium including a computer readable program, wherein the computer readable program when executed on a computer causes the computer to perform the steps recited in claim 17.

* * * * *